United States Patent
Mackin et al.

(10) Patent No.: US 11,085,372 B2
(45) Date of Patent: Aug. 10, 2021

(54) ANTI-ICE SYSTEM EXHAUST AIR DISRUPTOR

(71) Applicant: The Boeing Company, Chicago, IL (US)

(72) Inventors: Steve G. Mackin, Bellevue, WA (US); Kimberly A. Miller, Seattle, WA (US)

(73) Assignee: The Boeing Company, Chicago, IL (US)

( * ) Notice: Subject to any disclaimer, the term of this patent is extended or adjusted under 35 U.S.C. 154(b) by 401 days.

(21) Appl. No.: 16/038,550

(22) Filed: Jul. 18, 2018

(65) Prior Publication Data

US 2020/0025072 A1 Jan. 23, 2020

(51) Int. Cl.
| | |
|---|---|
| *F02C 6/08* | (2006.01) |
| *B64D 15/04* | (2006.01) |
| *F01D 17/10* | (2006.01) |
| *F01D 25/02* | (2006.01) |
| *F02C 9/18* | (2006.01) |
| *B64D 33/04* | (2006.01) |
| *B64D 33/02* | (2006.01) |

(52) U.S. Cl.
CPC ............ *F02C 6/08* (2013.01); *B64D 15/04* (2013.01); *B64D 33/04* (2013.01); *F01D 17/105* (2013.01); *F01D 25/02* (2013.01); *F02C 9/18* (2013.01); *B64D 2033/0233* (2013.01)

(58) Field of Classification Search
CPC ........... B64D 15/04; B64D 2033/0233; B64D 33/04; B64C 23/06; B64C 21/04; B64C 2230/04; B64C 2230/20; F01D 17/085
See application file for complete search history.

(56) References Cited

U.S. PATENT DOCUMENTS

| | | | | |
|---|---|---|---|---|
| 4,674,714 A | * | 6/1987 | Cole | B64D 15/04 244/134 B |
| 5,704,207 A | | 1/1998 | Jensen | |
| 6,092,360 A | * | 7/2000 | Hoag | F02C 7/32 60/783 |
| 2008/0217485 A1 | | 9/2008 | Ikeda | |
| 2012/0031995 A1 | * | 2/2012 | Maalioune | B64D 33/04 239/265.19 |
| 2012/0126061 A1 | * | 5/2012 | Raposeiro | B64C 1/1453 244/130 |
| 2012/0312023 A1 | * | 12/2012 | Ertz | F02C 7/06 60/772 |
| 2014/0331665 A1 | * | 11/2014 | Shivashankara | B64C 9/32 60/527 |

(Continued)

FOREIGN PATENT DOCUMENTS

| | | |
|---|---|---|
| EP | 2208669 A2 | 7/2010 |
| WO | 2013079100 A1 | 6/2013 |
| WO | 2016027187 A1 | 2/2016 |

*Primary Examiner* — Richard R. Green
*Assistant Examiner* — William L Gmoser
(74) *Attorney, Agent, or Firm* — Felix L. Fischer (57) ABSTRACT

An airflow disruptor for a gas turbine engine bleed air exhaust port employs a disruptor plate rotatably mounted upstream from an exhaust port of an exhaust duct. An actuator is coupled to the disruptor plate and adapted to rotate the disruptor plate into an external airflow responsive to temperature of exhaust flow in the exhaust port whereby the external airflow is turbulated upstream of the exhaust port.

20 Claims, 11 Drawing Sheets

(56) References Cited

U.S. PATENT DOCUMENTS

| | | | |
|---|---|---|---|
| 2014/0339357 A1* | 11/2014 | Richardson | B64D 15/04 244/54 |
| 2015/0031276 A1* | 1/2015 | Tretow | B64D 41/00 454/76 |
| 2015/0115099 A1* | 4/2015 | Payangapadan | B64C 1/0009 244/58 |
| 2016/0177724 A1* | 6/2016 | Sheoran | B64D 33/00 415/121.2 |
| 2016/0264251 A1* | 9/2016 | Bell | B64D 15/16 |
| 2016/0377487 A1 | 12/2016 | Cheung | |
| 2017/0233091 A1* | 8/2017 | Iarocci | B64D 33/08 244/129.5 |
| 2019/0176959 A1* | 6/2019 | Poloni | B64C 7/00 |

\* cited by examiner

ANTI-ICE SYSTEM EXHAUST AIR DISRUPTOR

BACKGROUND INFORMATION

Field

Implementations of the disclosure relate generally to the field of anti-ice systems for aircraft and more particularly a system for aerodynamic disruption and flow mixing of anti-ice system exit air.

Background

Large commercial aircraft employ anti-ice systems on leading edge surfaces of various elements of the aircraft including wing leading edges and, in particular, engine inlet cowl leading edges. In many anti-ice systems very high temperature air is used or generated to warm the leading edge surface to prevent ice formation or to de-ice the leading edge. The high temperature air is typically circulated within the interior volume of the leading edge and then exhausted to the external airflow downstream on the exterior of the nacelle structure aft of the leading edge. This can lead to significant heating of the external surface downstream of the exhaust port which may require special materials or increased structural weight to accommodate the heating effects.

SUMMARY

Implementations disclosed herein provide an airflow disruptor for a gas turbine engine bleed air exhaust port having a disruptor plate rotatably mounted upstream from an exhaust port of an exhaust duct. An actuator is coupled to the disruptor plate and adapted to rotate the disruptor plate into an external airflow responsive to temperature of exhaust flow in the exhaust port whereby the external airflow is turbulated upstream of the exhaust port.

The implementations disclosed provide a method for control of anti-ice system exhaust temperature. A disruptor plate is rotated upstream of an exhaust port to create turbulence in the external airflow providing a turbulated flow. Exhaust flow from the exhaust port is entrained into the turbulated flow thereby cooling the exhaust flow prior to impingement on a surface aft of the exhaust port.

BRIEF DESCRIPTION OF THE DRAWINGS

The features, functions, and advantages of an anti-ice system exhaust airflow disruptor can be achieved independently in various implementations of the present disclosure or may be combined in yet other implementations further details of which can be seen with reference to the following description and drawings.

DETAILED DESCRIPTION

Implementations disclosed herein provide an airflow disruptor for a gas turbine engine bleed air exhaust port such as that used in anti-ice systems. An active device, such as a door or plate, is installed upstream from the engine anti-icing exhaust port. The active device is preferably temperature activated or controlled. In operation, when the engine anti-icing system is activated the plate is rotated into the external airflow causing a disruption in airflow upstream from the exhaust port. This disruption causes the exhausted flow exiting the exhaust port to mix with the external airflow resulting in a mixed airstream having a reduced temperature. In an exemplary implementation, a temperature sensor may be installed in the anti-icing exhaust flow. Moreover, the disruptor plate may be electrically operated. In operation, when a temperature increases within the anti-icing system exhaust flow, the temperature sensor sends a temperature signal to a controller, the controller may then activate an actuator to open and/or close the door responsive to the sensed temperature.

In a second implementation, the active device includes a thermal actuator that is coupled directly to the disruptor plate. The thermal actuator may be mounted directly inside the anti-icing exhaust duct and connected to the disruptor plate via a linkage. In operation, when a temperature increases within the anti-icing exhaust duct, the thermal actuator moves the linkage which results in the disruptor plate opening. When the temperature decreases, the thermal actuator causes the disruptor plate to rotate in the opposite direction to close. As a result, the position of the disruptor plate is directly related to the temperature of the bleed air within the anti-icing exhaust duct.

In a third implementation, the active device further operates to introduce pressurizing air from the external airflow through an opening created by the opening disruptor plate into a plenum. The plenum ejects the pressurizing air through a primary eductor nozzle located within the exhaust duct acting as a concentric secondary eductor nozzle entraining and mixing with the exhaust flow. The eductor creates mixing in the flow prior to exit from the exhaust port thereby further enhancing cooling.

In a further implementation, the plate may be commanded open when the engine anti-icing system is activated and commanded closed when the anti-icing system is deactivated.

Figure 1:
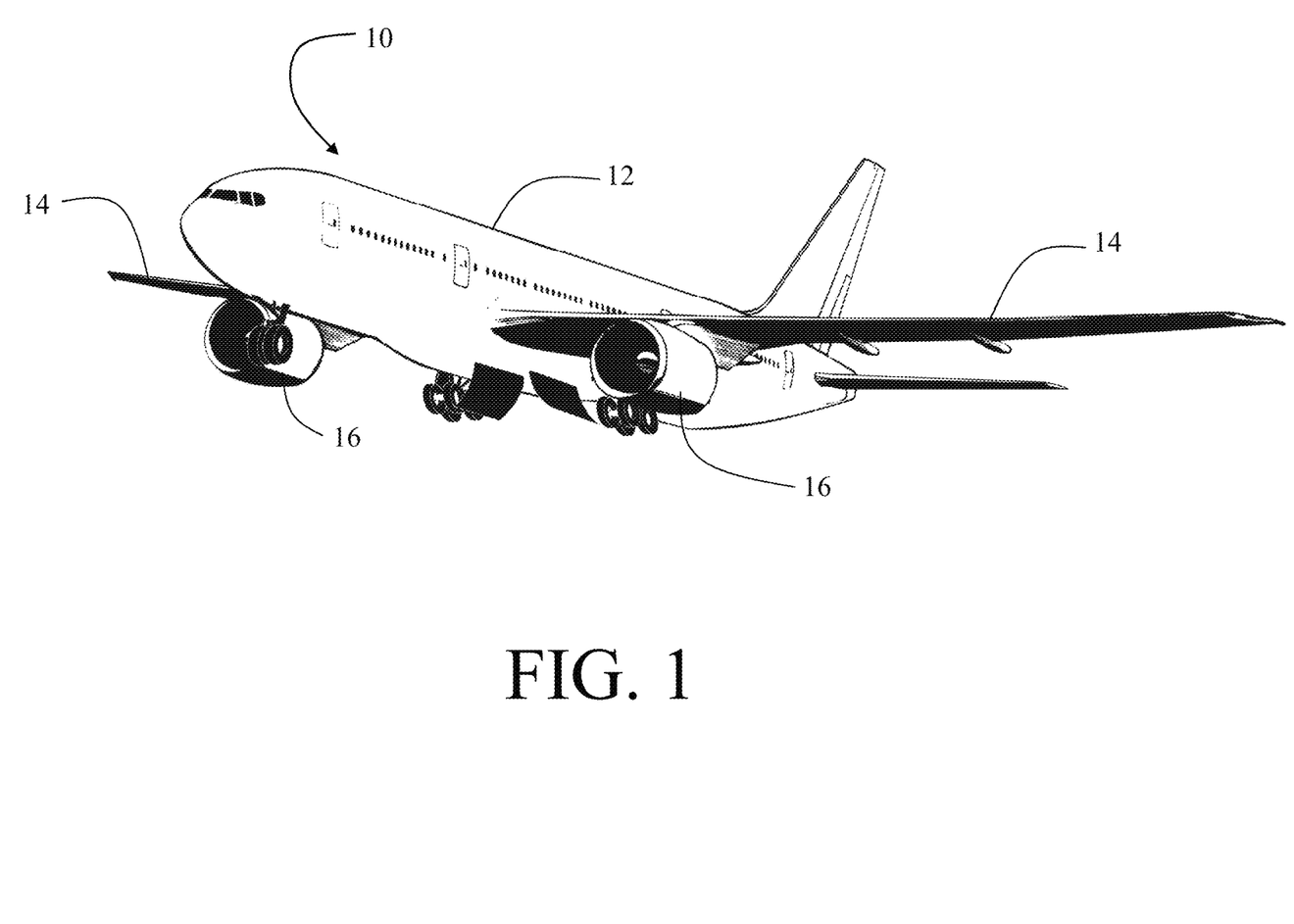
FIG. 1 is pictorial view of a commercial aircraft showing the placement of implementations for the anti-ice system exhaust disruptor.
Figure 2:
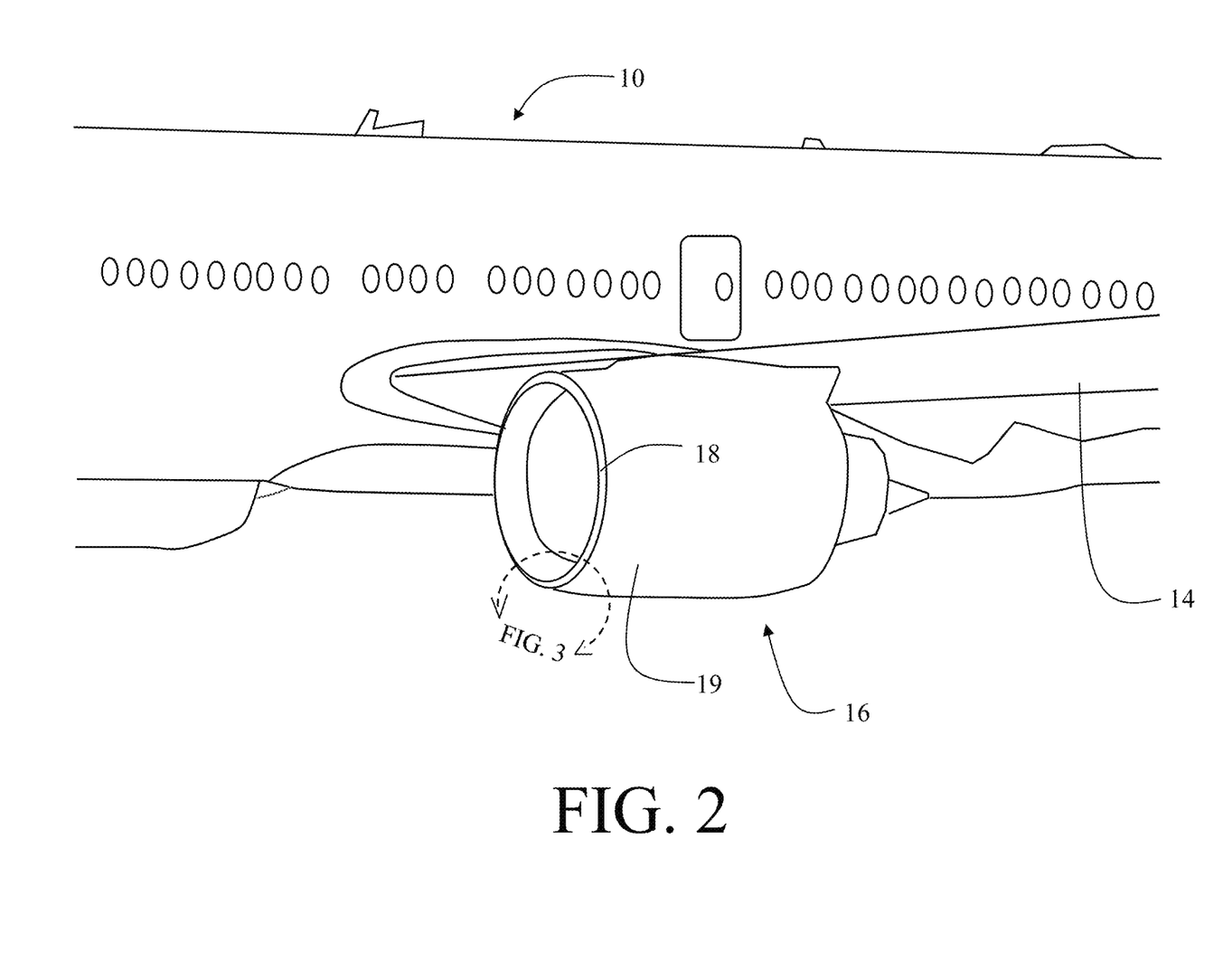
FIG. 2 is a pictorial view of the engine nacelle and inlet for an exemplary implementation of the anti-ice system exhaust disruptor.

Referring to the drawings, FIG. 1 shows an aircraft 10 having a fuselage 12, wings 14 and engine nacelles 16 for gas turbine engines mounted under the wings in a standard configuration. FIG. 2 is a close-up view of the port engine nacelle 16 showing a nose cowl 18 in which an anti-ice system may be employed. An exemplary location for implementations of the anti-ice system exhaust disruptor is shown and will be described in detail with respect to FIG. 3.

Figure 3:
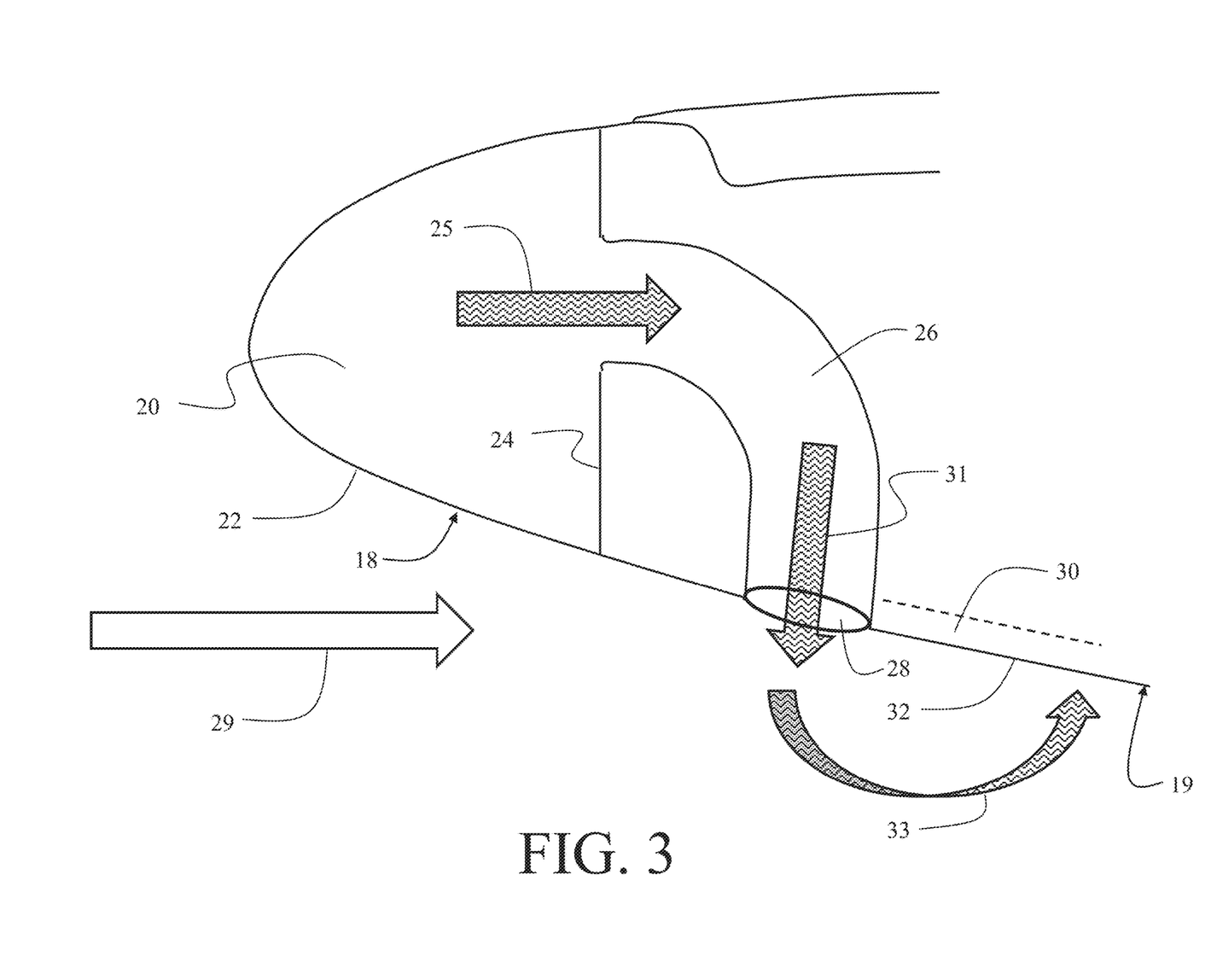
FIG. 3 is a detailed section view of a leading edge of an engine nacelle showing the exhaust duct from the leading edge volume in which an anti-ice system provides heated air and the exhaust outlet.

As seen in FIG. 3, the nose cowl 18 incorporates an interior volume 20 surrounded by a leading edge skin 22 and a bulkhead 24. High temperature air from an anti-ice system flows through the interior volume 20 to heat the leading edge skin 22 to prevent icing on the leading edge skin during flight. The flow of high temperature air exits the interior volume 20, as represented by arrow 25, through an exhaust duct 26 terminating in an exhaust port 28 in a skin 30 of the fan cowl 19 downstream of the leading edge skin 22 relative to the external airflow represented by arrow 29. High temperature exhaust flow, represented by arrow 31, flowing through the exhaust port 28 is introduced into the external airflow as represented by arrow 29 and impinges on an external surface 32 of the skin 30 that forms part of the fan cowl 19 of nacelle 16 as represented by arrow 33.

Figure 4:
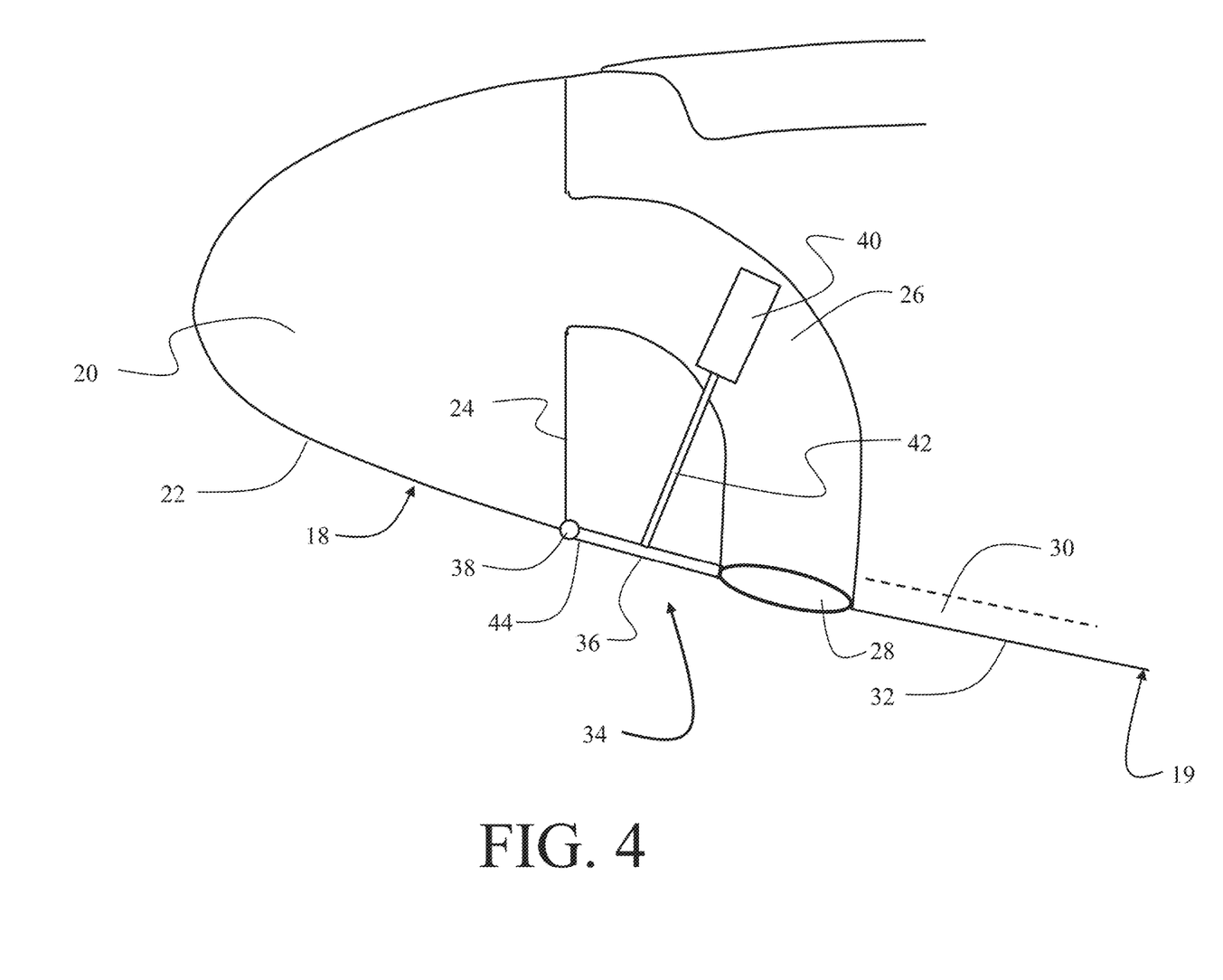
FIG. 4 is a detailed section view of the leading edge of the engine nacelle showing a first implementation of the anti-ice system exhaust disruptor in a closed position.

A first implementation of an anti-ice system exhaust airflow disruptor 34 is shown in FIG. 4. In the illustrated embodiment, the airflow disruptor 34 includes a disruptor plate 36 that is mounted forward of the exhaust port 28 with a hinge 38 that enables the disruptor plate 36 to rotate from a closed position wherein the disruptor plate 36 is substantially flush with the aerodynamic mold line of the leading edge skin 22 and fan cowl external surface 32 to an open position. The airflow disruptor 34 also includes an actuator 40, which may be an electrical motor or solenoid, or a hydraulic or pneumatic cylinder, with an associated actuating rod 42 is connected to the disruptor plate 36 for rotation of the disruptor plate 36 about the hinge 38.

Figure 5A:
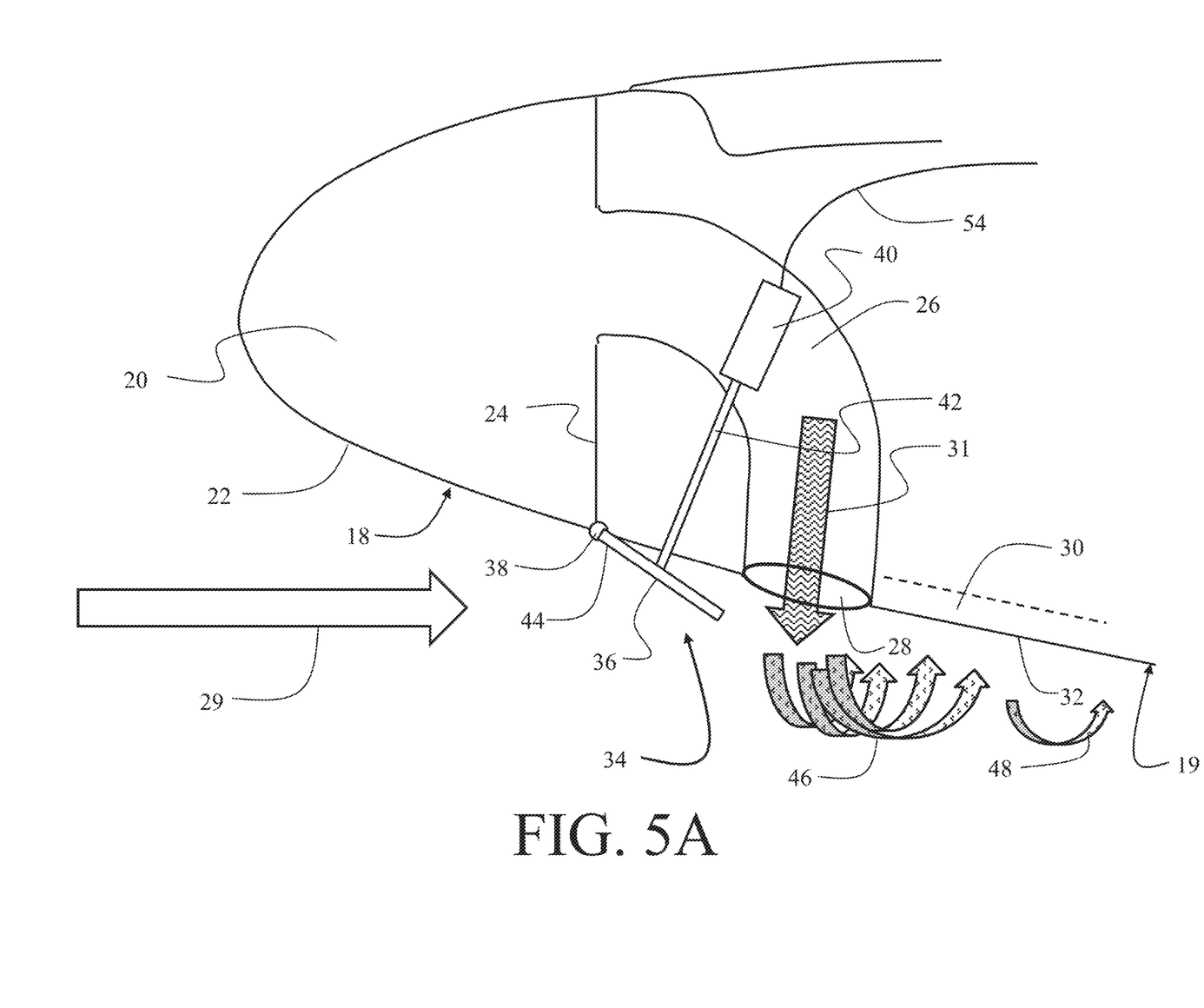
FIG. 5A is a detailed section view of the leading edge of the engine nacelle showing the first implementation of the anti-ice system exhaust disruptor in an open or operating position.

In the first implementation the hinge 38 is located at a forward edge 44 of the disruptor plate 36. In the exemplary implementation shown, the hinge 38 is located adjacent the bulkhead 24 for structural support. However, in alternative implementations the hinge 38 may be located fore or aft of the bulkhead 24. As seen in FIG. 5A, activation of the actuator 40 rotates the disruptor plate 36 about the hinge 38 into the external airflow 29. The external airflow impinging on the disruptor plate 36 creates turbulent flow, represented by arrows 46, flowing downstream from the disruptor plate 36 over the exhaust port 28 entraining the exhaust flow 31. A turbulated flow ("turbulated" as used herein defined as entrained and mixed with induced turbulence), represented by arrow 48, which is significantly cooler than the exhaust flow 31, then impinges on the external surface 32 of the skin 30 aft of the exhaust port 28.

Figure 5B:
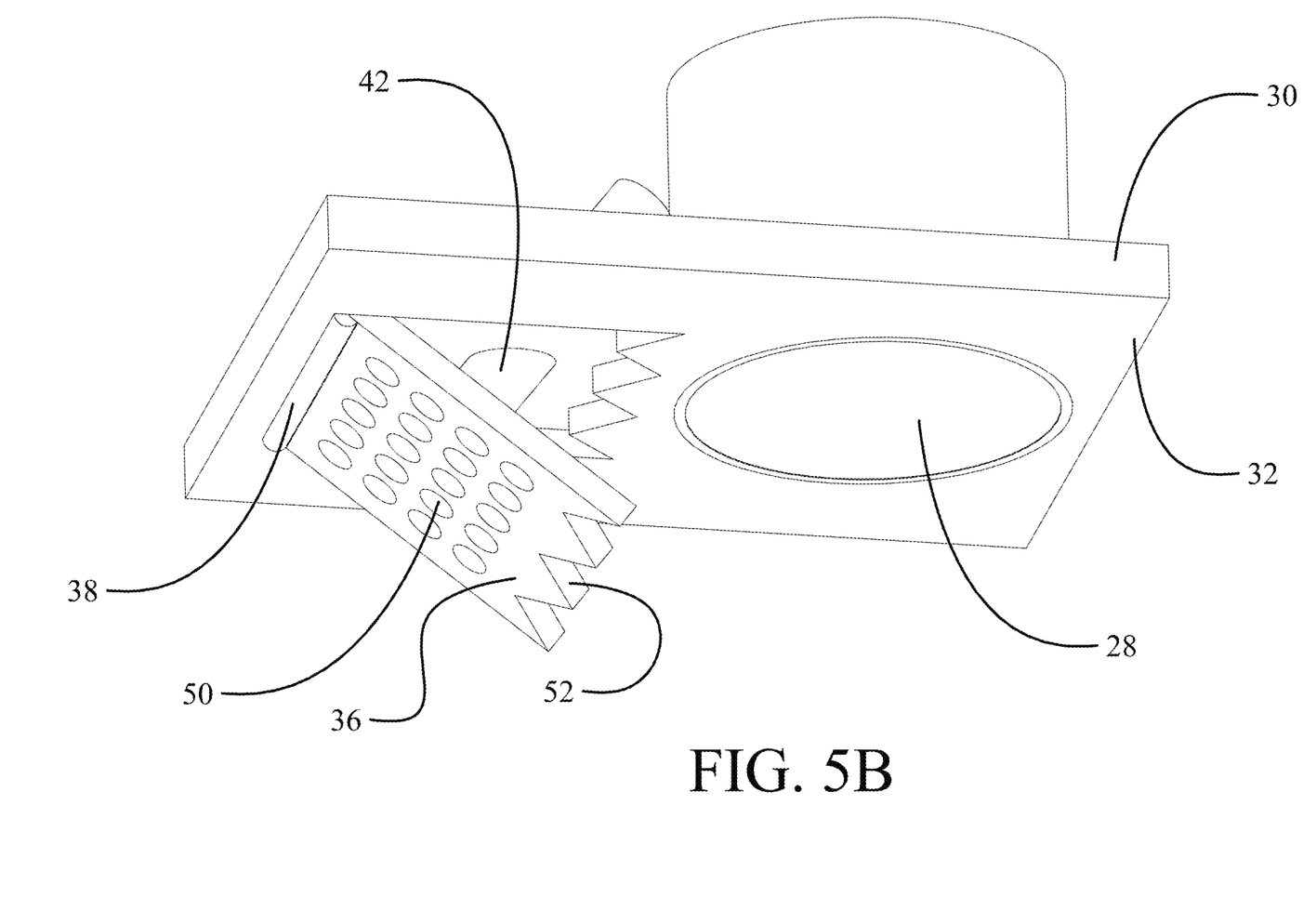
FIG. 5B is a pictorial view of the disruptor plate in the first implementation.

As seen in FIG. 5B, the disruptor plate 36 may incorporate features such as perforations 50 or trailing edge treatments such as a sawtooth trailing edge 52 to enhance turbulence imparted by the disruptor plate 36 to the external airflow. The additional turbulence may induce enhanced cooling of the exhaust exiting the exhaust port 28 prior to reattachment of the flow on the external surface 32 aft of the exhaust port.

The cooled flow created by the anti-ice system exhaust disruptor 36 may allow less expensive and lighter weight low temperature materials to be used downstream of the exhaust port 28 for potential overall cost and weight reduction for the aircraft. The anti-ice system exhaust disruptor 36 may also mitigate issues faced with shorter engine inlets where the anti-ice system exhaust can impinge on more critical areas of the nacelle since the nacelle is shorter.

As will be described in greater detail with respect to FIG. 9 subsequently, the activation of the anti-ice system exhaust airflow disruptor 34 and the extent of rotation of the disruptor plate 36 is a function of the anti-ice system exhaust temperature which may vary significantly during operation depending on supercooled liquid water content of the freestream air, airspeed of the aircraft, outside air temperature and engine operating parameters determining the temperature of the high temperature air supplied to the anti-ice system. Actuator 40 may be adapted to provide extension of actuating rod 42 over a range of positions to enable the disruptor plate 36 to transition from a fully closed position to a fully open position thereby providing the required turbulation for adequate mixing of the exhaust flow to temperature reduction without unnecessarily impacting aerodynamic performance. As seen in FIG. 5A, a control signal 54 is provided to the actuator 40 for control of the range of extension of the disruptor plate 36.

Figure 6:
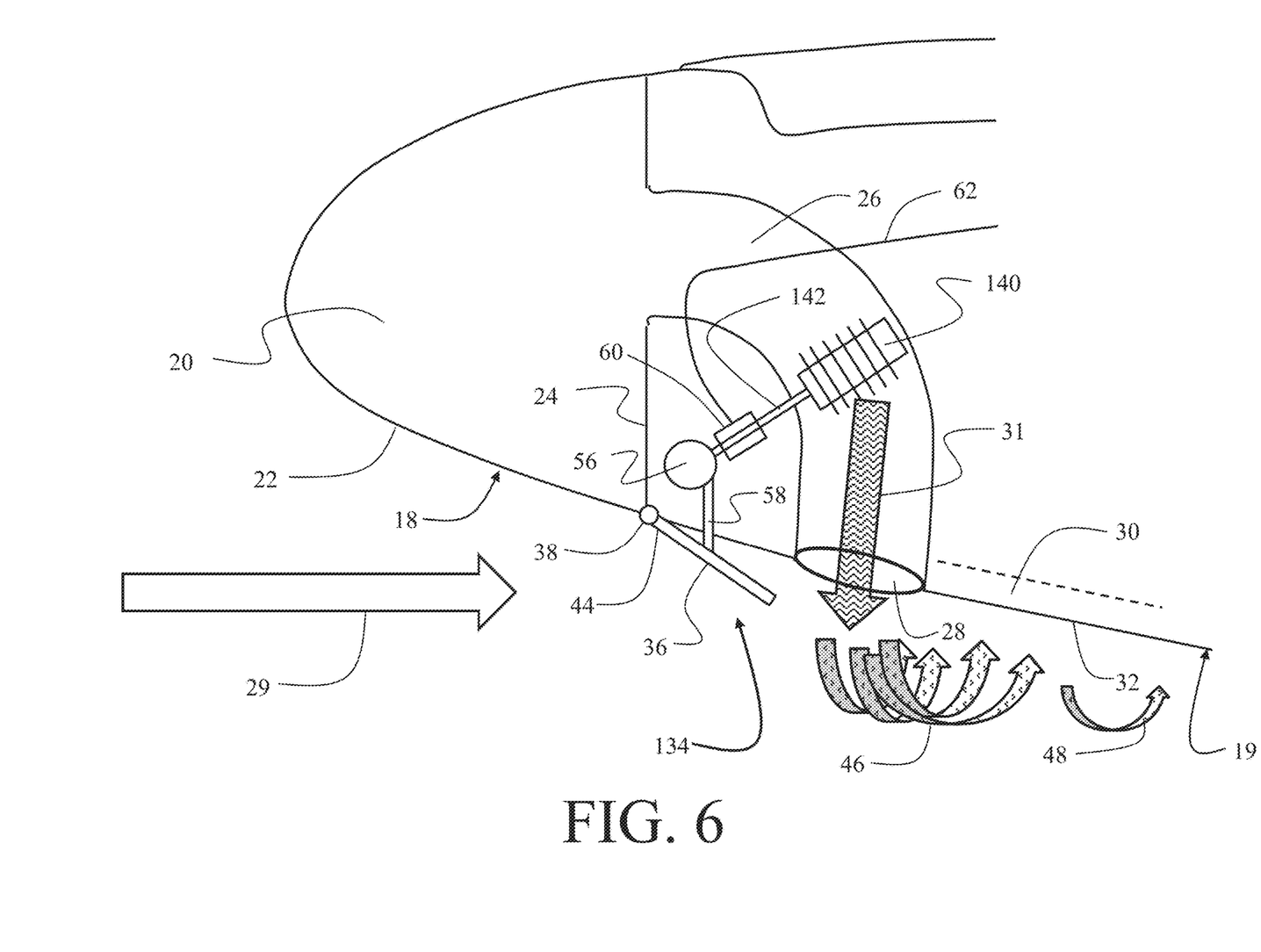
FIG. 6 is a detailed section view of the leading edge of the engine nacelle showing a second implementation of the anti-ice system exhaust disruptor with additional control and operating features.

A second implementation of an anti-ice exhaust air airflow disruptor 134 is shown in FIG. 6. As in the first implementation, the disruptor plate 36 is attached at a forward edge 44 for rotation about a hinge 38. A thermal actuator 140 employing shape memory alloy (SMA) may provide either rotational or translational input to a linkage incorporating an actuating element 142 connected to a force multiplying mechanism 56. A drive rod 58 is connected between the force multiplying mechanism 56 and the disruptor plate 36 for rotation of the disruptor plate. If additional force capability or conversion from rotary to linear motion is required for the actuator 40 of the first implementation a similar linkage including a force multiplier mechanism and drive rod may be employed. Operation of the disruptor plate 36 to create turbulence in the external airflow for entrainment of the exhaust flow 31 to provide mixing downstream of the exhaust port 28 is substantially identical to the first implementation.

Placement of the SMA actuator 140 within the exhaust duct 26 may allow independent and automatic operation of the actuator responsive to varying temperature of the exhaust flow 31; a higher temperature resulting in increased rotation or extension of the SMA in the actuator 140 and a lower temperature resulting in retraction of the SMA. A position sensor, such as a linear variable differential transformer (LVDT) 60 or similar device, may be used to sense the amount of rotation of the disruptor plate 36 by actual position of either the actuating element 142 or drive rod 58 and provide a position feedback signal 62 to a control and monitoring system. Alternatively, a rotation sensor in the hinge 38 may be employed. As in the first embodiment, a range of positions for the disruptor plate 36 is obtained for providing the required turbulence for adequate mixing of the exhaust flow to temperature reduction without unnecessarily impacting aerodynamic performance A LVDT may be similarly employed in the first implementation of the anti-ice system exhaust airflow disruptor 34 to provide feedback for the range of extension of the actuator rod 42.

Figure 7:
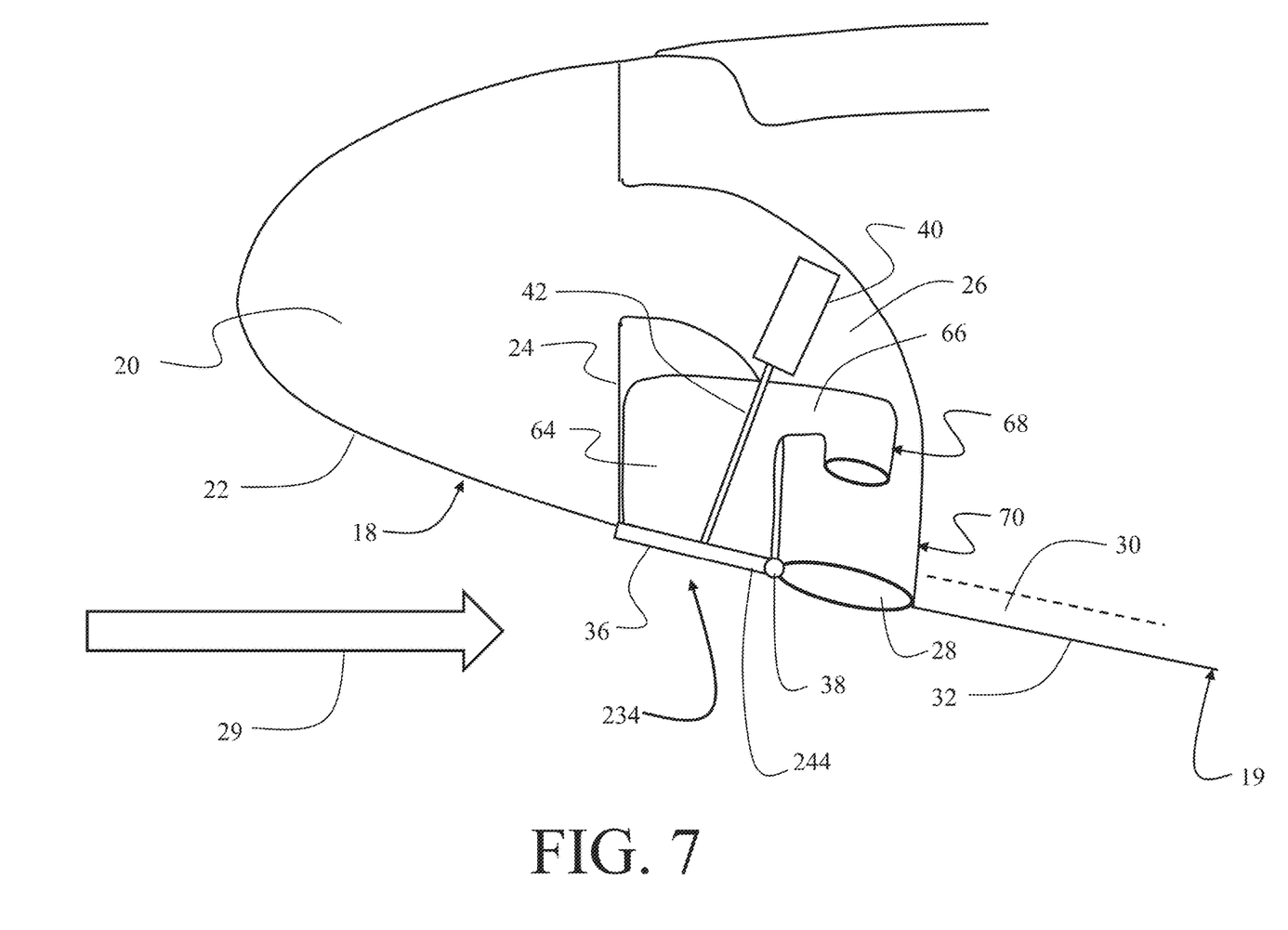
FIG. 7 is a detailed section view of the leading edge of the engine nacelle showing a third implementation of the anti-ice system exhaust disruptor in a closed position.
Figure 8:
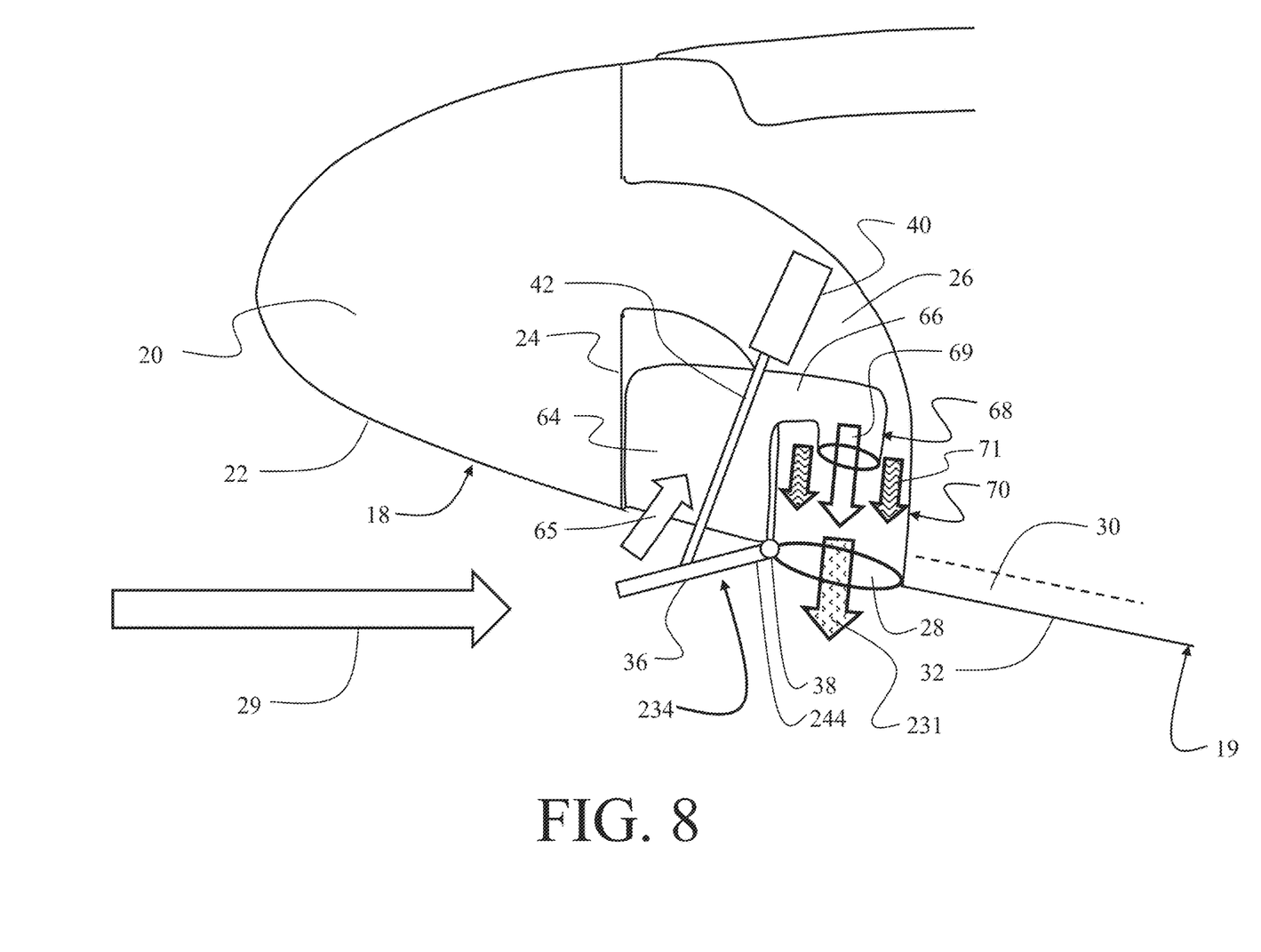
FIG. 8 is a detailed section view of the leading edge of the engine nacelle showing the third implementation of the anti-ice system exhaust disruptor in an open or operating position.

A third implementation of an anti-ice system exhaust airflow disruptor 234 is shown in FIG. 7. The anti-ice system exhaust airflow disruptor 234 employs a disruptor plate 36 as in prior implementations. However, the hinge 38 is attached to a trailing edge 244 of the disruptor plate 36. As seen in FIG. 8, activation of actuator 40 and actuator rod 42 rotate the disruptor plate 36 about the hinge 38 opening a plenum 64 to receive pressurizing air flow, represented by arrow 65, from the external airflow 29. As in the prior implementations, rotation of the disruptor plate 36 creates turbulence in the external airflow downstream of the disruptor plate over the exhaust port 28 with associated mixing of the exiting exhaust flow. However, plenum 64 additionally incorporates a conduit 66 extending into the exhaust duct 26 with a flow exit port providing an eductor primary nozzle 68 while the concentric exhaust duct creates an eductor secondary nozzle 70. The pressurized air flow 65 in the plenum creates a cool jet, represented by arrow 69, ejected from the eductor primary nozzle 68 which entrains and mixes exhaust flow, represented by arrows 71, in the eductor secondary nozzle 70. Exhaust port 28 now provides an eductor outlet and the resulting exhaust flow, represented by arrow 231, is mixed and cooled. Exhaust flow 231 is then further mixed by the turbulated flow resulting from the direct action of the disruptor plate 36 on the external airflow to produce an enhanced cooled flow adjacent the downstream surface 32. As in the prior implementations rotation of disruptor plate 36 through a range of angles from a closed position to a fully open position controls inlet flow of the pressurizing air flow 65 as well as turbulation of the external airflow 29 downstream of the disruptor plate.

Figure 9:
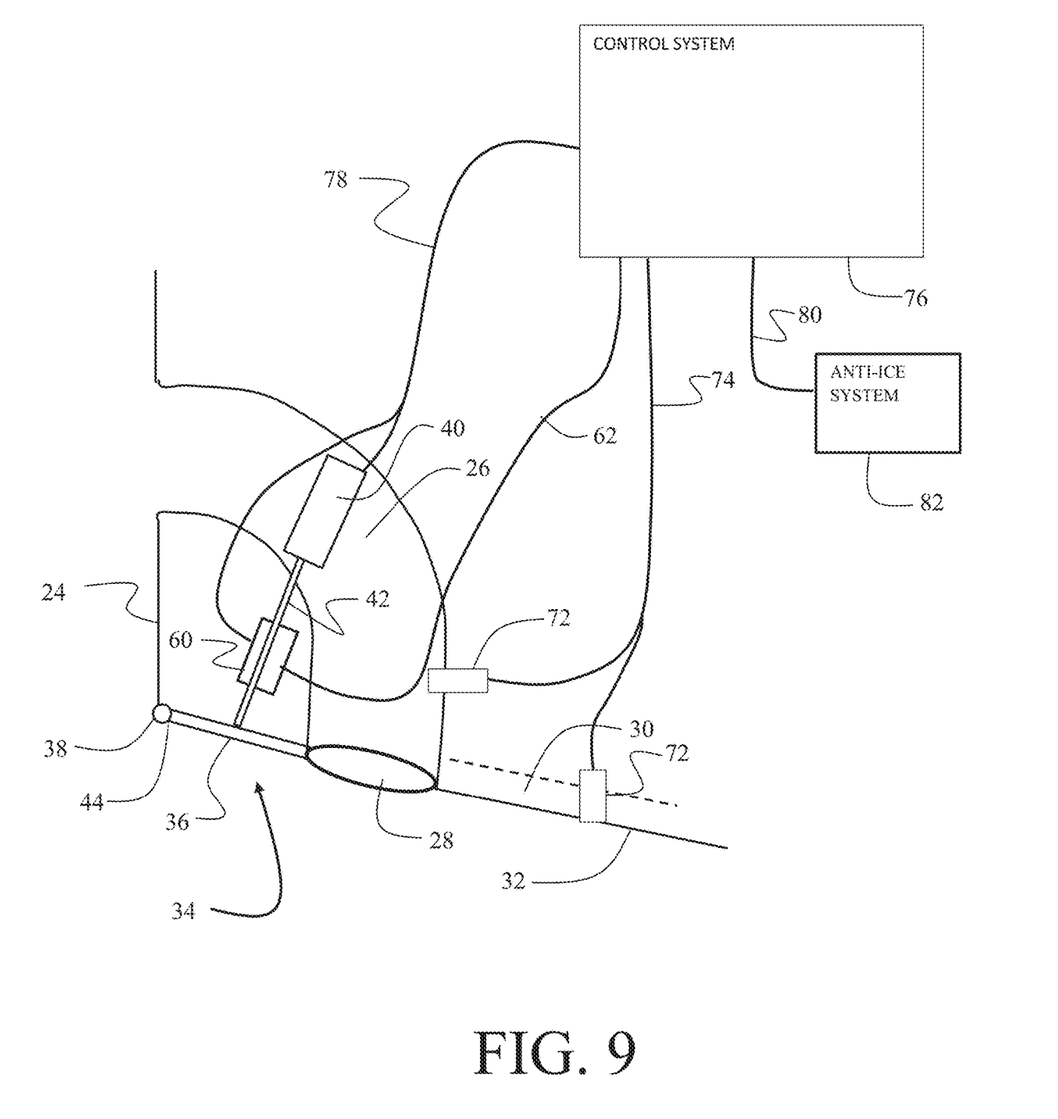
FIG. 9 is a block diagram of a control system for the anti-ice system exhaust disruptor; and, FIG. 10 is a flow chart of the operation of the implementations for anti-ice system exhaust disruptor.

Control of the implementations of the anti-ice system exhaust airflow disruptor 34, 134 or 234 may be accomplished as shown in FIG. 9. Temperature sensors 72 are placed to sense temperature in the exhaust duct 26 or on the external surface 32 of the fan cowl 19 and provide a temperature signal 74 to a control system 76. Responsive to the temperature signal 74 indicating a temperature above a threshold activation temperature, the control system 76 then provides an actuation signal 78 to the actuator 40. In the first and third implementations of the anti-ice system exhaust airflow disruptor, 34, 234, the actuation signal may be proportional to temperature over the threshold value to provide rotation of the disruptor plate 36, by the actuator rod 42, such that the disruptor plate 36 is disposed in a position between fully closed and fully open to achieve the necessary cooling of the exhaust flow 31, 71, as previously described. In the second implementation of the anti-ice system exhaust airflow disruptor 134, the actuation signal 78 may merely be a power on signal to the actuator 40 for operation of the LVDT 60 to provide actual position feedback signal 62 to the control system 76; operation of the SMA actuator 140 being automatically proportional to the temperature in the exhaust conduit as previously described.

As an alternative to temperature sensed actuation of the disruptor plate 36, an anti-icing system activation signal 80 may be provided to the control system 76 when the anti-icing system 82 is activated. The actuation signal 78 may then be issued by the control system 76 to command the actuator 40, 240 to rotate the disruptor plate 36 to an open position. Upon deactivation of the anti-icing system the anti-icing system activation signal 80 is removed and the control system 76 commands the actuator 40, 240 to rotate the disruptor plate 36 to a closed position.

Figure 10:
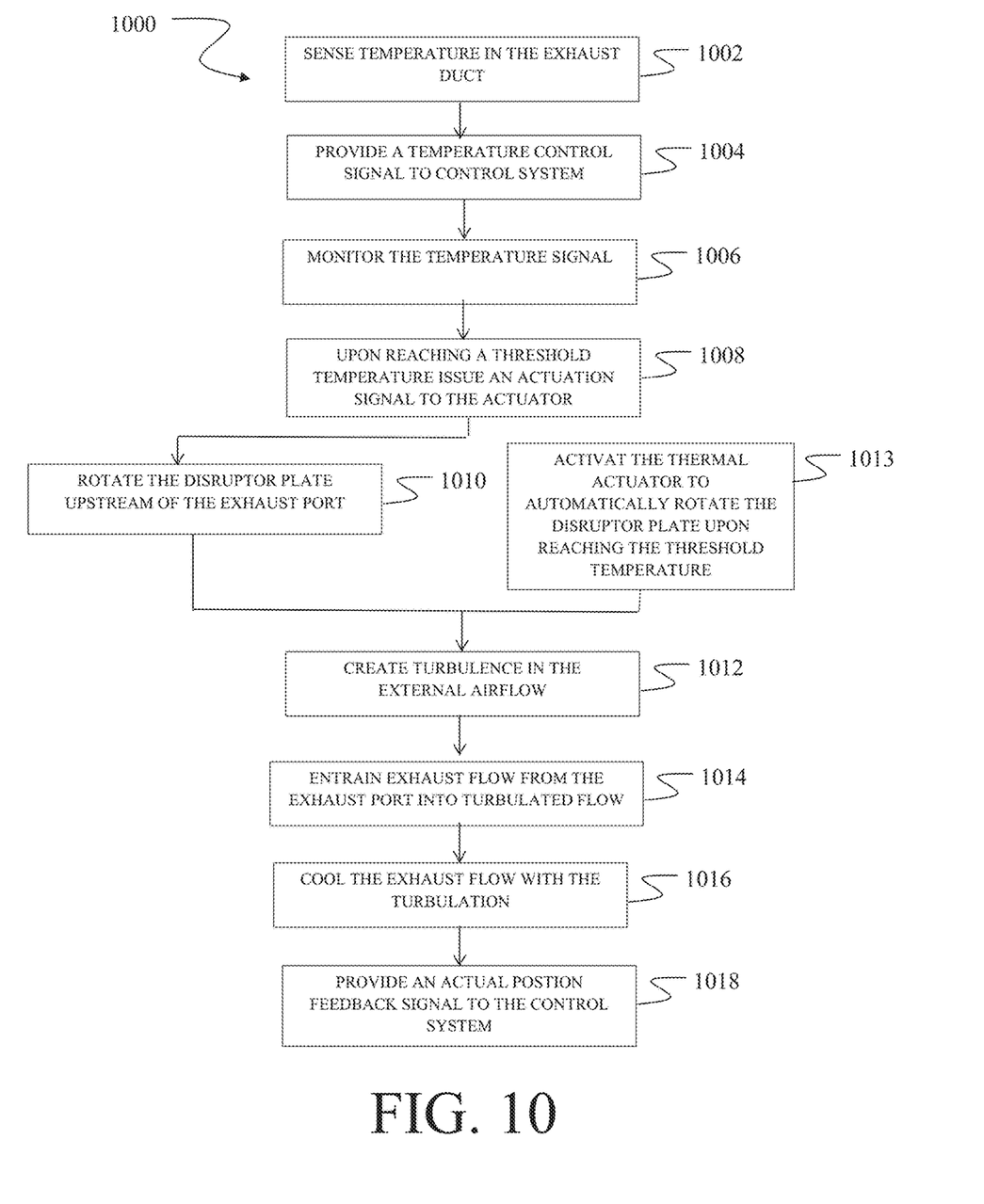

The various implementations of the anti-ice system exhaust disruptor provide a method 1000 for control of anti-ice system exhaust temperature as shown in FIG. 10. Temperature is sensed in the exhaust duct 26 or on the surface 32 aft of the exhaust duct, step 1002, and a temperature signal 74 is provided to a control system 76, step 1004. The control system 76 includes modules to monitor the temperature signal 74, step 1006 and, upon reaching a threshold temperature, an actuation signal 78 is issued to the actuator 40, 140, 240, step 1008. Responsive to the actuation signal in the first and third embodiments, the actuator 40, 240 rotates the disruptor plate 36 upstream of the exhaust port 28, step 1010, to create turbulence in the external airflow 29 upstream of the exhaust port, step 1012. In the second embodiment, activation of the thermal actuator 140 upon reaching the threshold temperature automatically rotates the disruptor plate 36, step 1013. Exhaust flow from the exhaust port is entrained into the turbulated flow, step 1014, thereby cooling the exhaust flow prior to impingement on the surface 32 aft of the exhaust port, step 1016. An actual position feedback signal 62 may be provided to the control system 76, step 1018, to enhance disruptor plate position control by adjustment of the actuation signal 78 responsive to both the temperature signal 74 and actual position feedback signal 62.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:

1. An anti-ice system employing gas turbine engine bleed air, the anti-ice system comprising:
   an engine nacelle with a nose cowl having a leading edge skin and a bulkhead forming an interior volume receiving high temperature engine bleed air;
   an exhaust duct extending from the interior volume to an exhaust port in a fan cowl skin downstream of the leading edge skin;
   a disruptor plate mounted upstream from the exhaust port, said disruptor plate mounted with a hinge, wherein the disruptor plate is entirely located upstream of the exhaust port;
   an actuator coupled to the disruptor plate, the actuator adapted to rotate the disruptor plate about the hinge into an external airflow responsive to temperature of exhaust flow in the exhaust port whereby the external airflow is turbulated upstream of the exhaust port.

2. The anti-ice system as defined in claim 1 further comprising a temperature sensor and wherein the actuator is operable responsive to a temperature signal from the temperature sensor.

3. The anti-ice system as defined in claim 2 further comprising a control system receiving the temperature signal and issuing an actuation signal to the actuator responsive to the temperature signal exceeding a threshold value.

4. The anti-ice system defined in claim 3 wherein the actuation signal is proportional to temperature over the threshold value as indicated by the temperature signal.

5. The anti-ice system as defined in claim 4 wherein the disruptor plate is rotatable through a range of positions from fully closed to fully open responsive to the temperature signal.

6. The anti-ice system as defined in claim 1 wherein the disruptor plate incorporates perforations.

7. The anti-ice system as defined in claim 1 wherein the disruptor plate incorporates a trailing edge treatment.

8. The anti-ice system as defined in claim 1 wherein the actuator is a thermal actuator, said thermal actuator positioned within the exhaust duct.

9. The anti-ice system as defined in claim 8 wherein the actuator employs a shape memory alloy (SMA).

10. The anti-ice system as defined in claim 9 wherein the actuator is responsive to varying temperature of exhaust flow in the exhaust duct, a higher temperature resulting in increased rotation or extension of the SMA in the actuator and a lower temperature resulting in retraction of the SMA.

11. The anti-ice system as defined in claim 5 further comprising a position sensor, said position sensor adapted to sense an amount of rotation of the disruptor plate and provide a position feedback signal.

12. The anti-ice system as defined in claim 11 wherein the position sensor comprises a linear variable differential transformer (LVDT).

13. The anti-ice system defined in claim 1 wherein the disruptor plate is rotatably mounted at a trailing edge of the disruptor plate and further comprising a plenum opened by rotation of the disruptor plate to receive pressurizing air from the external airflow, said plenum having a conduit extending into the exhaust duct with a flow exit port providing an eductor primary nozzle and wherein the exhaust duct is concentric to the eductor primary nozzle to create an eductor secondary nozzle.

14. An airflow disruptor for a gas turbine engine bleed air exhaust port, the airflow disruptor comprising:
    a disruptor plate rotatably mounted at a trailing edge of the disruptor plate upstream from an exhaust port of an exhaust duct;
    a plenum opened by rotation of the disruptor plate to receive pressurizing air from the external airflow, said plenum having a conduit extending into the exhaust duct with a flow exit port providing an eductor primary nozzle and wherein the exhaust duct is concentric to the eductor primary nozzle to create an eductor secondary nozzle;
    an actuator coupled to the disruptor plate, the actuator adapted to rotate the disruptor plate into an external airflow responsive to temperature of exhaust flow in the exhaust port whereby the external airflow is turbulated upstream of the exhaust port; and,
    a temperature sensor, wherein the actuator is operable responsive to a temperature signal from the temperature sensor.

15. The airflow disruptor as defined in claim 14 further comprising a control system receiving the temperature signal and issuing an actuation signal to the actuator responsive to the temperature signal exceeding a threshold value.

16. The airflow disruptor as defined in claim 15 wherein the actuation signal is proportional to temperature over the threshold value as indicated by the temperature signal.

17. The airflow disruptor as defined in claim 16 wherein the disruptor plate is rotatable through a range of positions from fully closed to fully open responsive to the temperature signal.

18. A method for control of anti-ice system exhaust temperature comprising:
    receiving high temperature engine bleed air in an engine nacelle with a nose cowl having a leading edge skin and a bulkhead forming an interior volume;
    extracting the bleed air from the interior volume with an exhaust duct extending from the interior volume to an exhaust port in a fan cowl skin downstream of the leading edge skin;
    rotating a disruptor plate mounted upstream of an exhaust port to create turbulence in an external airflow providing a turbulated flow, wherein the disruptor plate is entirely located upstream of the exhaust port; and
    entraining exhaust flow from the exhaust port into the turbulated flow thereby cooling the exhaust flow prior to impingement on a surface aft of the exhaust port.

19. The method as defined in claim 18 further comprising:
    sensing temperature in an exhaust duct or on a surface aft of the exhaust port;
    providing a temperature signal; and
    monitoring the temperature signal and, upon reaching a threshold temperature issuing an actuation signal to an actuator.

20. The method as defined in claim 18 further comprising mounting a thermal actuator in an exhaust duct; and wherein the step of rotating the disruptor plate comprises actuating the thermal actuator upon reaching the threshold temperature.

* * * * *